(12) United States Patent
Zamir et al.

(10) Patent No.: US 10,699,003 B2
(45) Date of Patent: Jun. 30, 2020

(54) VIRTUAL AIR-GAPPED ENDPOINT, AND METHODS THEREOF

(71) Applicant: Hysolate Ltd., Tel Aviv-Jaffa (IL)

(72) Inventors: Tal Zamir, Tel Aviv (IL); Oleg Zlotnik, Nesher (IL); Boris Figovsky, Hadera (IL)

(73) Assignee: HYSOLATE LTD., Tel Aviv-Jaffa (IL)

( * ) Notice: Subject to any disclaimer, the term of this patent is extended or adjusted under 35 U.S.C. 154(b) by 212 days.

(21) Appl. No.: 15/808,306

(22) Filed: Nov. 9, 2017

(65) Prior Publication Data

US 2018/0213001 A1 Jul. 26, 2018

Related U.S. Application Data

(60) Provisional application No. 62/449,123, filed on Jan. 23, 2017.

(51) Int. Cl.
*G06F 21/53* (2013.01)
*H04L 29/06* (2006.01)
(Continued)

(52) U.S. Cl.
CPC .......... *G06F 21/53* (2013.01); *G06F 9/45537* (2013.01); *G06F 9/45545* (2013.01); *G06F 9/45558* (2013.01); *G06F 21/606* (2013.01); *H04L 61/2015* (2013.01); *H04L 63/02* (2013.01); *H04L 63/0209* (2013.01); *H04L 63/0272* (2013.01); *H04L 63/0815* (2013.01); *H04L 63/10* (2013.01); *H04L 63/1416* (2013.01); *H04L 63/1491* (2013.01); *H04L 63/20* (2013.01); *H04W 12/0806* (2019.01);
(Continued)

(58) Field of Classification Search
CPC .. G06F 21/53; G06F 9/45558; G06F 9/45545; G06F 2009/45562; G06F 2009/45595; G06F 2009/45587; H04L 63/20
See application file for complete search history.

(56) References Cited

U.S. PATENT DOCUMENTS 6,496,847 B1 * 12/2002 Bugnion .............. G06F 9/45533
703/21
9,116,733 B2 8/2015 Banga et al.
(Continued)

*Primary Examiner* — Christopher C Harris
(74) *Attorney, Agent, or Firm* — M&B IP Analysts, LLC

(57) ABSTRACT

An air-gapped computing system includes at least network card interface; a processing circuitry; and a memory, the memory containing instructions that, when executed by the processing circuitry, configure the system to: initialize a hypervisor for execution over a primitive OS; create a plurality of isolated security zones by instantiating a plurality of corresponding virtual machines using the hypervisor, wherein each of the plurality of security zones includes a plurality of applications executed over a guest OS; instantiate a networking virtual machine using the hypervisor; control, by the networking virtual machine, access of each application in each of the plurality of security zones to an external network resource; and monitor execution of the guest OS and each application in at least one activated security zone of the plurality of security zones, wherein the monitoring is performed to maintain compliance with a security policy corresponding to each activated security zone being monitored.

31 Claims, 8 Drawing Sheets

(51) Int. Cl.
 *G06F 9/455* (2018.01)
 *G06F 21/60* (2013.01)
 *H04W 12/08* (2009.01)
 *H04L 29/12* (2006.01)

(52) U.S. Cl.
 CPC ........... *G06F 2009/4557* (2013.01); *G06F 2009/45562* (2013.01); *G06F 2009/45587* (2013.01); *G06F 2009/45591* (2013.01); *G06F 2009/45595* (2013.01); *H04L 63/0263* (2013.01)

(56) References Cited

U.S. PATENT DOCUMENTS

| | | | |
|---|---|---|---|
| 9,129,123 B2 | 9/2015 | Mooring | |
| 9,218,489 B2 | 12/2015 | Mooring et al. | |
| 9,386,021 B1 | 7/2016 | Pratt | |
| 9,417,904 B2 | 8/2016 | Shin et al. | |
| 10,310,696 B1* | 6/2019 | Taylor | G06F 9/45545 |
| 2006/0146057 A1* | 7/2006 | Blythe | G06F 9/45537 |
| | | | 345/506 |
| 2011/0113467 A1* | 5/2011 | Agarwal | G06F 21/6281 |
| | | | 726/1 |
| 2012/0054744 A1* | 3/2012 | Singh | G06F 21/53 |
| | | | 718/1 |
| 2014/0282813 A1* | 9/2014 | Botzer | H04L 63/20 |
| | | | 726/1 |
| 2014/0351810 A1 | 11/2014 | Pratt et al. | |
| 2015/0248554 A1* | 9/2015 | Dumitru | G06F 21/53 |
| | | | 726/1 |
| 2015/0277949 A1* | 10/2015 | Loh | G06F 9/45558 |
| | | | 711/152 |
| 2016/0021149 A1 | 1/2016 | Maistri et al. | |
| 2016/0285914 A1* | 9/2016 | Singh | H04L 63/20 |
| 2017/0180325 A1* | 6/2017 | Palermo | H04L 63/04 |

* cited by examiner

VIRTUAL AIR-GAPPED ENDPOINT, AND METHODS THEREOF

CROSS-REFERENCE TO RELATED APPLICATIONS

This application claims the benefit of U.S. Provisional Application No. 62/449,123 filed on Jan. 23, 2017, the contents of which are hereby incorporated by reference.

TECHNICAL FIELD

The present disclosure relates generally to security systems, and more specifically to allowing air gapping security using virtual computing.

BACKGROUND

Air gapping is a security measure that involves isolating a computer from an external connection. For example, an air gapped computer is one that is physically segregated and incapable of connecting wirelessly or physically with other computers or network devices. Air gapped systems and networks are used to protect many types of critical systems, such as those utilized in industries including financial, military, government, utility facilities, and the like.

Preventing a computer or a network from accessing an external network significantly limits the productivity of users using such a computer or network. For example, an application executed on an "air gapped" computer cannot access any resource over the Internet. To do so, the user would need to use a different computer having access to the Internet.

In the related art, there are a number of solutions attempting to isolate different computing environments on a single computer. However, such solutions do not provide a complete air gapping architecture. Furthermore, such solutions often suffer from user experience issues.

As a prime example, some isolation solutions are based on virtual machine (VM) technologies. That is, VMs are containers in which applications and guest operating systems can be executed. By design, all VMs are isolated from one another. This isolation enables multiple virtual machines to run securely while sharing hardware.

Although virtual machines share hardware (e.g., CPU, memory, and I/O devices, etc.), a guest operating system running on an individual virtual machine cannot detect any device other than the virtual devices made available to the guest operating system. In various virtualization environments, a hypervisor acts as an interface between the guest operating system and the host operating system for some or all of the functions of the guests. A host operating system directly interacts with the hardware. A host operating system may be Windows®, Linux®, and the like.

Endpoints (e.g., desktop or laptop computer) configured with VM isolation do not provide a complete defense against malicious code. One vulnerability point in such virtualization environments is the host operating system. That is, hackers can exploit security vulnerabilities integrated in such operating systems to propagate malicious code to the hypervisors and then to the guest operating systems. Further, a user can install malicious software directly on the host operating systems (i.e., outside of the virtualization environment). To prevent users from installing software directly on the host operating system, such an operating system should be restricted. However, such an approach limits the user experience as the user cannot install applications, plug-ins, change settings, and so on, with a restricted operating system.

Other isolation solutions are based on the sandboxing of critical applications executed on an endpoint. The sandboxing is achieved by running each application in a separate VM. This isolation can also be penetrated by hackers, as the sandboxed applications are often executed over a vulnerable host operating system which is controlled by the user and has a wide attack surface.

Another isolation solution is based on separating any browsing activity from the endpoint to eliminate malware and phishing from websites and emails. In such solutions, the browser is executed in a VM in a cloud computing platform, where all webpages are rendered in the cloud and sent to the endpoint for display therein. This solution does not defend from other applications executed in a typical endpoint. Further, such solution does not prevent a user from installing malicious software on the endpoint.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for operating an air-gapped endpoint. The method comprises initializing, on the endpoint, a hypervisor for execution over a primitive operating system (OS) of the endpoint; creating a plurality of isolated security zones by instantiating a plurality of corresponding virtual machines using the hypervisor, wherein each of the plurality of security zones includes a plurality of applications executed over a guest OS; instantiating a networking virtual machine using the hypervisor; controlling, by the networking virtual machine, access of each application in each of the plurality of security zones to an external network resource; and monitoring execution of the guest OS and each application in at least one activated security zone of the plurality of security zones, wherein the monitoring is performed to maintain compliance with a security policy corresponding to each activated security zone being monitored.

Certain embodiments disclosed herein also include a non-transitory computer readable medium having stored thereon causing a processing circuitry to execute a process for operating an air-gapped endpoint.

Certain embodiments disclosed herein also include am air-gapped computing system, comprising: at least network card interface; a processing circuitry; and a memory, the memory containing instructions that, when executed by the processing circuitry, configure the system to: initialize a hypervisor for execution over a primitive operating system (OS); create a plurality of isolated security zones by instantiating a plurality of corresponding virtual machines using the hypervisor, wherein each of the plurality of security zones includes a plurality of applications executed over a guest OS; instantiate a networking virtual machine using the hypervisor; control, by the networking virtual machine, access of each application in each of the plurality of security zones to an external network resource; and monitor execution of the guest OS and each application in at least one activated security zone of the plurality of security zones, wherein the monitoring is performed to maintain compliance with a security policy corresponding to each activated security zone being monitored.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
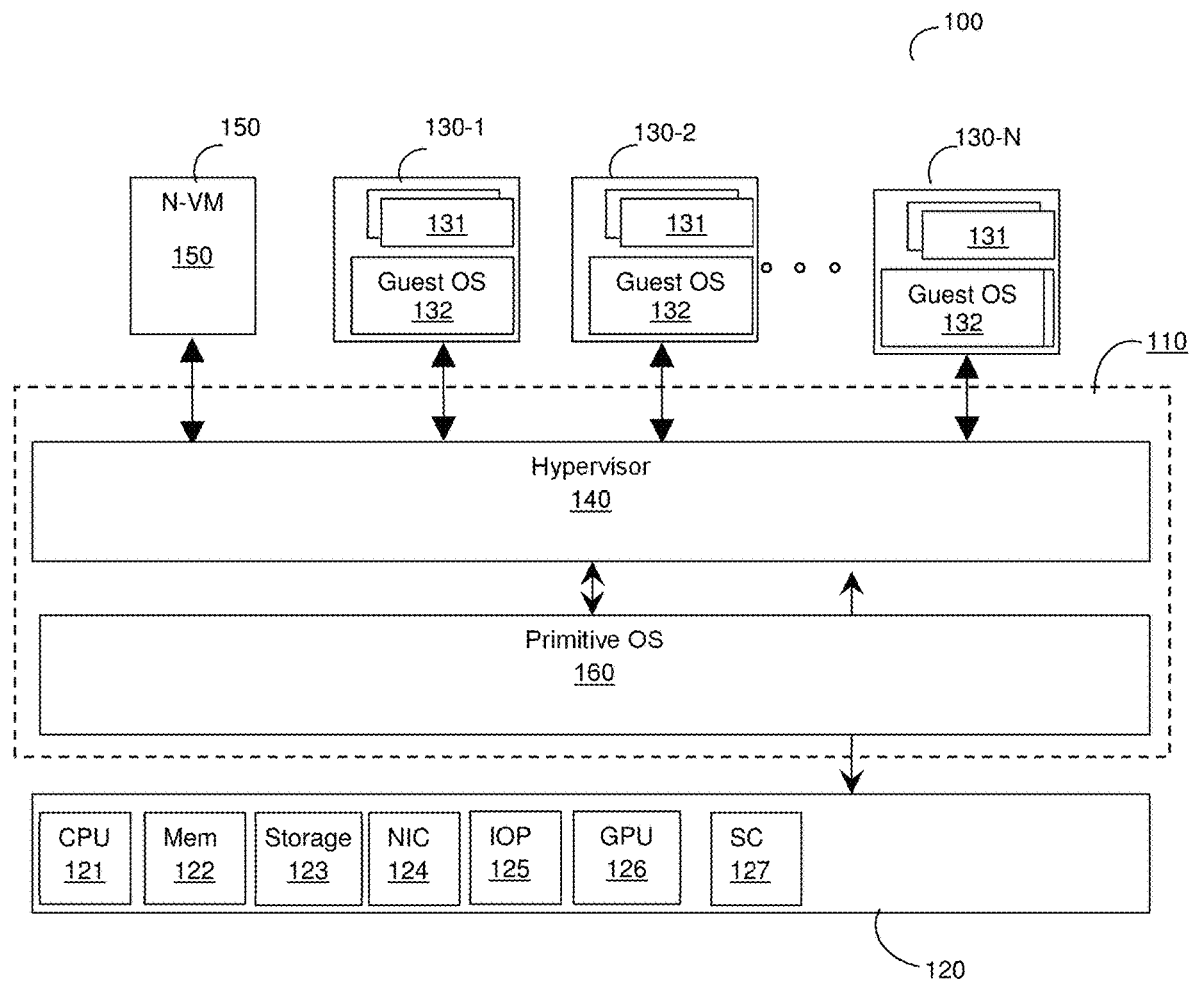
FIG. 1 is a schematic diagram of an endpoint arranged with a virtualized environment according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example to the disclosed embodiments, a virtualized environment designed to secure endpoints from execution of malicious code is provided. Specifically, the disclosed embodiments allow for operation of any endpoint in a virtual air-gap mode, thereby ensuring that the endpoint is isolated from unsecured resources (such as networks, external drives, and the like). The disclosed virtualized environment allows for executing multiple applications in a number of different secured zones, while providing a seamless user experience.

In an embodiment, each zone is isolated from other zones, and each application that can be accessed by a user is executed in one of a few virtualized environments. In addition, the virtualized environment does not require a full host OS to interface between the security zones and the hardware of the endpoint. As another security measure, a user of the endpoint cannot configure any element of the underlying virtualized environment.

FIG. 1 shows a schematic diagram illustrating an endpoint 100 arranged with a virtualized environment 110 according to an embodiment. The endpoint 100 may be a computing device, such as a personal computer (PC) in a form factor of either a laptop or desktop.

The endpoint 100 includes hardware 120, such as can be found in a standard desktop or laptop computer. The hardware 120 may include, for example, a processing circuitry (CPU) 121, a memory (Mem) 122, a storage 123, a network interface card (NIC) 124, input/output (I/O) peripherals (1OP) 125, a graphics processing unit (GPU) 126, and a sound card (SC) 127. The processing circuitry 121 may be realized by one or more hardware logic components and circuits. For example, and without limitation, a general-purpose microprocessor, a central processing unit (CPU), a multi-core CPU, a digital signal processor (DSP), and the like, or any other hardware logic components that can perform calculations or other manipulations of information. The memory 122 may be volatile (e.g., RAM, etc.), non-volatile (e.g., ROM, flash memory, etc.), or a combination thereof.

The storage 123 may be magnetic storage, optical storage, and the like and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information. The NIC 124 allows the endpoint 100 to communicate with external networks over a wired connection, a wireless connection, or both.

The NIC 124 may transmit communication media, receive communication media, or both. For example, the NIC 124 may in a form of a modem, an integrated network interface, a radio frequency transmitter/receiver, an infrared port, a USB connection, and the like.

The I/O peripheral 125 allows connectivity to external peripherals, such as a disk drive, printers, wireless keyboard, pointing device, a microphone, a speaker, a docking station, and the like. The I/O peripherals 125 may allow connectivity through USB ports, PS/2 ports, Infrared ports, and the like. The GPU 126 provides connectivity to a monitor display. The sound card 127 (or audio card) provides input and output of audio signals to and from an endpoint under control of guest OS.

It should be noted that other hardware components are included in a typical hardware of an endpoint which are not illustrated herein. Such components may include, but are not limited to, a motherboard, a power source, and the like.

According to the disclosed embodiments, the virtualized environment 110 is designed to provide a complete virtual air-gapping for a plurality of security zones 130-1 through 130-n (hereinafter referred to individually as a security zone 130 and collectively as security zones 130, merely for simplicity purposes). The virtualized environment 110 is also arranged to include a hypervisor 140 controlling the security zones 130, a networking VM (N-VM) 150, and a primitive operating system (OS) 160.

Each security zone 130 is realized as a virtual machine executing a plurality of applications 131 over a guest OS 132. Each security zone 130 is configured to host applications based on their security and sensitivity levels. For example, a security zone 130 may be a corporate zone for general corporate applications, a personal zone for untrusted content and applications, a privileged IT zone for production applications, a financial zone for sensitive financial applications (e.g., SWIFT), a zone for critical infrastructure applications (e.g., SCADA), and so on.

Each security zone 130 is completely isolated from each of the other zones 130. That is, an application executed in zone 130-1 cannot access any content or applications executed in zone 130-2.

As an example, the zone 130-1 may be a trusted corporate zone (executing sensitive corporate applications) while the zone 130-2 can run applications that can access untrusted applications and resources. That is, the corporate zone 130-1 provides access to sensitive corporate resources and can be strictly locked down, while the personal zone 130-2 can provide free access to the Internet and allow the user to install and run any application.

According to the disclosed embodiments, the virtualized environment 110 provides a complete separation between the zones 130-1 and 130-2, thereby providing a complete air-gap between the zones. As will be discussed below, applications from different zones 130 are displayed on the same display, content can be copied from one zone to another (under a control of a user), and switching between zones is seamless. Thus, the virtualized environment 110 would allow improved productivity for users.

The operation of the security zones 130 is controlled by the hypervisor 140. Specifically, the hypervisor 140 is configured to instantiate a VM for each security zone 130. The applications 132 are executed in each corresponding VM. The hypervisor 140 is configured to present the zones 130, and hence the applications 131 executed therein, with a unified user experience (UX).

According to an embodiment, the hypervisor 140 is also configured to instantiate the N-VM 150. The N-VM 150 is not accessible to the user, i.e., no user applications are executed therein and no local configuration of the N-VM 150 is allowed. The N-VM 150 is configured to control and regulate access to the external networks (not shown in FIG. 1) through the NIC 124. Examples for such networks may include, but are not limited to, the Internet, a local area network (LAN), a virtual private network (VPN), a short-range network (e.g., Bluetooth®), and the like. The operation of the N-VM 150 is discussed in greater detail below.

According to the disclosed embodiments, after instantiating the VMs of the zones 130 and the N-VM 150, the hypervisor 140 is configured to virtualize the components of the hypervisor 140. That is, for each guest OS 132, the hypervisor 140 provides a limited set of virtualized hardware services. For example, when the user is in a security zone 130-1 an access to a microphone will be permitted to access the applications 131 running in that zone.

In an embodiment, the hypervisor 140 is configured to instantiate and control the VMs, as well as to virtualize hardware services to such VMs. This allows for programming the hypervisor 140 with a significantly lower number of code lines, thereby reducing the risks of vulnerabilities that can be exploited by, for example, the guest OS 132. In an embodiment, controlling the VMs (zones 130) includes enforcing security policies for each zone, as discussed in greater detail below.

Figure 2:
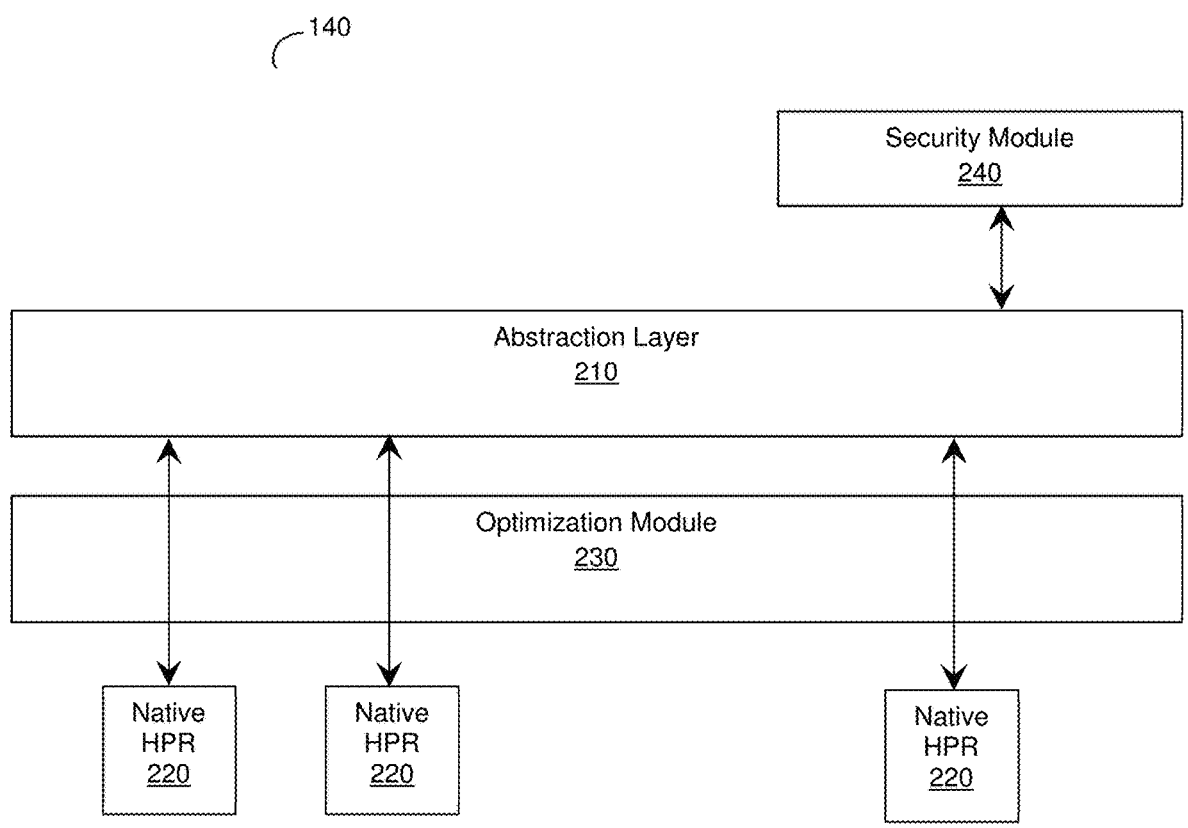
FIG. 2 is a block diagram illustrating the arrangement of a hypervisor according to an embodiment.

FIG. 2 is an example block diagram illustrating the arrangement of the hypervisor 140 according to an embodiment. The hypervisor 140 includes an abstraction layer 210 that allows the integration with a plurality of commercially available native hypervisors 220. Non-limiting examples for such native hypervisors 220 include Oracle® VM, Microsoft® Hyper-V®, and the like. The native hypervisors 220 primarily provide access to guest OSs such as Windows® 10, Windows® 7, Linux, and the like.

The hypervisor 140 also includes an optimization module 230 configured to perform optimization processes to accelerate or otherwise improve the operation of the native hypervisors 220. Such optimization processes include, but are not limited to, display optimization (3D and graphic rendering), audio optimization (playback and audio recordings), and power optimization.

In an embodiment, the audio optimization includes bypassing all emulation layers, typically performed by a standard native hypervisor when emulating a sound card (127, FIG. 1). To this end, the optimization module 230 is configured to interact directly with an application layer of a guest OS 130, so as to receive the audio signals. The optimization module 230 replays the audio signals to the audio card (in the host's hardware device). This allows for reducing latency involved by emulating the standard audio hardware, thereby improving latency and performance.

In another embodiment, the display optimization includes causing the GPU (126, FIG. 1) to render only specific windows of applications running in a VM (zone), and displaying such windows on a desktop display of another VM. To this end, the optimization module 230 is configured to provide the GPU 126 only with the regions of the application windows in the guest OS. Such regions can be deducted from the data provided by a guest OS. The optimization module 230 is further configured to capture a full screen display of the VM and instruct the GPU 126 to crop that VM's virtual display window while not rendering any region that does not belong to one of the application windows in the guest OS. It should be noted that the GPU 126 would typically show the VM's virtual display as a full screen window. This optimization allows minimal data copy of each frame, resulting in improved video performance.

In yet another embodiment, the power optimization is designed to extend the operating hours of a battery (not shown). The virtualized environment (110, FIG. 1) is designed to run multiple operating systems in multiple VMs. This can rapidly drain battery power as there is intensive usage of the processing circuitry (121, FIG. 1) and I/O devices by multiple operating systems instead of just one I/O device on a normal machine.

The optimization module 230 is configured to "freeze" all virtual machines (i.e., change their current states into an idle state) that do not have an active foreground window. In their idle state, VMs no longer consume CPU or perform I/O operations. The applications executed in the idle (frozen) VMs are displayed in their last state before the freeze operation. When the user switches the focus back to one of the frozen VMs, the optimization module 230 changes its state to that of a normal operation. It should be noted that the power optimization provides a security benefit, as a frozen VM cannot be attacked because it does not have any attack-vulnerable surface at that time.

According to the disclosed embodiments, the hypervisor 140 also includes a security module 240 configured to directly communicate with the VMs 130 and 150. That is, any request to access the hypervisor 140 is received and handled by the security module 240. In an embodiment, a request (or command) to access a resource of the hypervisor 140 is captured by the security module 240 such that the request does not reach the OS 160. For example, a keyboard shortcut (e.g., Ctrl+C) would be captured and handled by the hypervisor 140. That is, the hypervisor 140 disclosed herein prevents any interfacing of a user device with the primitive OS 160.

Returning to FIG. 1, the primitive OS 160 is configured to merely execute device drivers. For example, a display driver, a printer driver, a PCIe chipset drivers will be executed by the primitive OS 160. The primitive OS 160 does not and cannot access any user applications (e.g., applications installed by a user), any user-controlled OS, or any user commands. That is, the primitive OS 160 cannot execute any code which may be originated from any software installed or uploaded by the user. For example, a user accesses an unsecure website from a browser running in a personal secure zone and unintentionally downloads a malware. The malware cannot access and cannot be executed by the primitive OS 160. Further, the user cannot directly install software applications outside of the security zones 130, and specifically cannot install software directly on the primitive OS 160.

In an embodiment, the primitive OS 160 is configured to execute only pre-signed code. Thus, any malware code will not be executed by the primitive OS 160. In yet another embodiment, the primitive OS 160 cannot access the NIC 124, thus, cannot access an external network. The communication is performed through the N-VM 150. To this end, any TCP/IP activity by the primitive OS is controlled and restricted by the N-VM 150.

In an example implementation, the primitive OS 160 may implement a virtual NIC (not shown) configured with a virtual IP to allow communication with the N-VM 150. In yet another embodiment, the files of the primitive OS 160 are non-persistent, ensuring that the primitive OS 160 is reset to its original configuration after each boot of the endpoint 110. In yet another embodiment, the files of the primitive OS 160 are encrypted, so that cannot be tampered or manipulated.

In an embodiment, the primitive OS 160 may be, for example, Windows®, Mac OS®, or Linux®, that has been configured to allow only execution of drivers and to eliminate any functionality as discussed herein.

Figure 3:
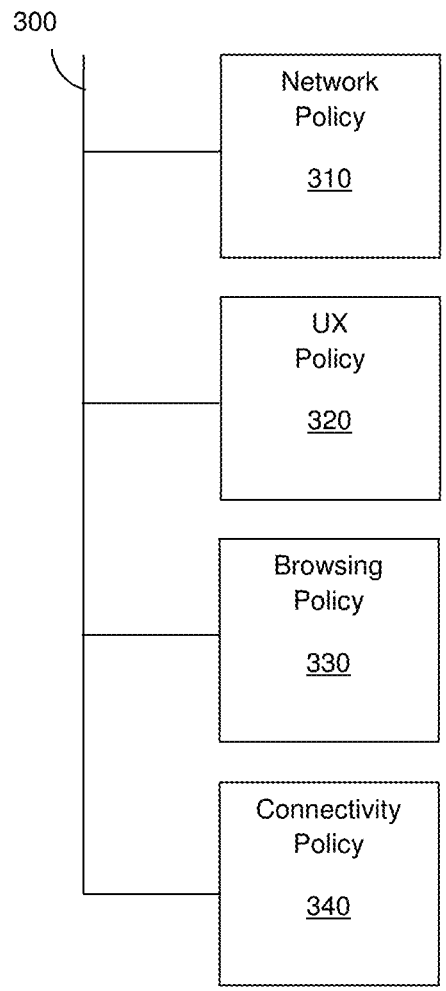
FIG. 3 is a policy diagram of a security policy structured according to an embodiment.

The N-VM 150 is configured to manage network connectivity. That is, the N-VM 150 is monitoring and policing all communications between the applications 131 in the different security zones 130 and external networks (not shown in FIG. 1). In an embodiment, the N-VM 150 is configured with a network policy (e.g., the network policy 310, FIG. 3) for each security zone 130 determining which networks can be accessed for the zone. The network policy may be defined for each application 131 in a zone or for a group of applications. Further, the access may be defined with a set of permissions. As an example, a full access to a network resource, a limited access to a network resource, access is permitted after authentication, and so on.

In an embodiment, all network access requests are routed to the N-VM 150. In response, the N-VM 150 is configured to identify for a security zone 130 (i.e., a VM) requesting to access an external network. The N-VM 150 allows or denies the access request based on the network policy determined for the requesting zone. As an example, requests from a personal zone to a corporate network will be blocked by the N-VM 150, while requests from a corporate network to the same network will be allowed. The network policies are pre-configured using, for example, a management server (not shown in FIG. 1) connected to the endpoint 100. The management server is discussed in detail herein below.

It should be appreciated that the primitive OS 160, the hypervisor 140, or both, do not manage the network connection, and as such do not allow or deny connections to external networks. It should be further appreciated that physical connection to the external networks is established through the NIC 124 under the control of the N-VM 150. The N-VM 150 operates in a non-persistent mode and is reverted to its initial state upon each connect or disconnect event, adding another layer of security in case the N-VM 150 somehow becomes infected.

In an embodiment, the N-VM 150 is configured to perform network identification at various layers, e.g., MAC layer, TCP/IP layer, and application layer (e.g., HTTPS or SSL identification). In another embodiment, the network policies can be enforced by applying access control or firewall rules at TCP/IP or application layers (e.g., layers 4 or 7 of the OSI module). In yet another embodiment, the N-VM 150 is configured to allow connection using VLAN tags or through DHCP proxy implemented in the N-VM 150.

It should be appreciated that the virtualized environment 110 provides a complete virtual air-gapping secured solution to applications executed in each security zone even if one or more of the zones becomes vulnerable. The design of the virtualized environment 110 assumes that all VMs, guest OSs, and applications executed in the zones 130 are not trusted. Additional layers of protection are achieved by means of the hypervisor 140, the N-VM 150, and the limited functionality of the primitive OS 160.

As an example, a corporate zone (e.g., one of the security zones 130) is infected by a malicious bot communicating with a command-and-control server. According to the disclosed embodiments, the bot cannot communicate with its command-and-control server on the Internet, as such access attempt will be blocked by the N-VM 150. That is, the N-VM 150 may allow access to an internal corporate network or a whitelisted set of cloud hosts, as defined in a network policy for the corporate zone.

In an embodiment, VMs of the security zones 130 are non-persistent. That is, the VMs are initialized to an original configuration after each boot, logoff, application event, and so on. That is, VMs infected with malware will return to their initial "clean" state after, e.g., each boot.

The operation of the security zones 130 is also regulated by additional preconfigured policies. In an embodiment, illustrated in FIG. 3, a security policy 300 is preconfigured for a security zone 130. A security policy 300 includes at least a network policy 310, a user interface (UX) policy 320, a browsing policy 330, and a connectivity policy 340. A security policy 300 is configured for each security zone 130 by, for example, a management server.

In an example embodiment, the UX policy 320 defines which user interface actions are allowed to be performed by the user in the respective zone. Examples for such actions include, but are not limited to, clipboard, printing, screen-shoting, and the like. As a non-limiting example, the UX policy 320 can define if the user can copy content and paste such content in a different zone, or if content from a different zone can be pasted in the current zone. Content may include, for example, text, an image, a file and the like. The UX policy 320 may also designate what type of content can be copied, pasted, or both.

In an embodiment, cross-transfer of content between security zones is allowed only when explicitly approved by the user. This ensures that a malware cannot copy content from one zone to another.

The browsing policy 330 defines a whitelist of URLs or domain names that can be accessed from a browser executed in the respective zone. This allows, for example, blocking browsers from accessing malicious URLs when the user mistakenly browses to such URLs in the wrong security zone. In an optional embodiment, the blocked URL can be accessed and launched in another security zone which is allowed to access that URL. It should be noted that the browsing policy 330 is different from the network policy 310 in that it restricts access to certain URLs after a network established (based on the definitions) defined in the network policy. The network policy 310 is discussed in detailed above.

The connectivity policy 340 defines a set of allowed peripheral devices through wired or wireless connections. As an example, the connectivity policy 340 may define if connections through a USB plug are allowed or restricted. Restricted connectivity may limit all connections or connections to designated USB devices (e.g., printer but not Flash Drive). Examples for other wired connections may include, for example, DisplayPort, Thunderbolt™, HDMI, PS/2, and the like. Wireless connections may include short range connections that allow wireless docking of peripheral devices (e.g., WiGig™), and the like.

Returning to FIG. 1, the disclosed embodiments allow concurrent execution of applications 131 from different security zones 130. In one configuration, one security zone (e.g., 130-1) is set as a primary zone, while another secure zone (e.g., 130-2) is set as a secondary zone. The applications and OS of the primary zone are executed in the foreground, while those of the secondary zone are executed on the background. Primarily, a user can interact with applications of the primary zone, i.e., windows of such applications are displayed on the endpoint's display.

In one embodiment, the applications from the secondary zone can be displayed on the endpoint's display providing the user with the ability to interact with applications from different zones. Windows of applications from different zones are optionally marked differently.

Figure 4:
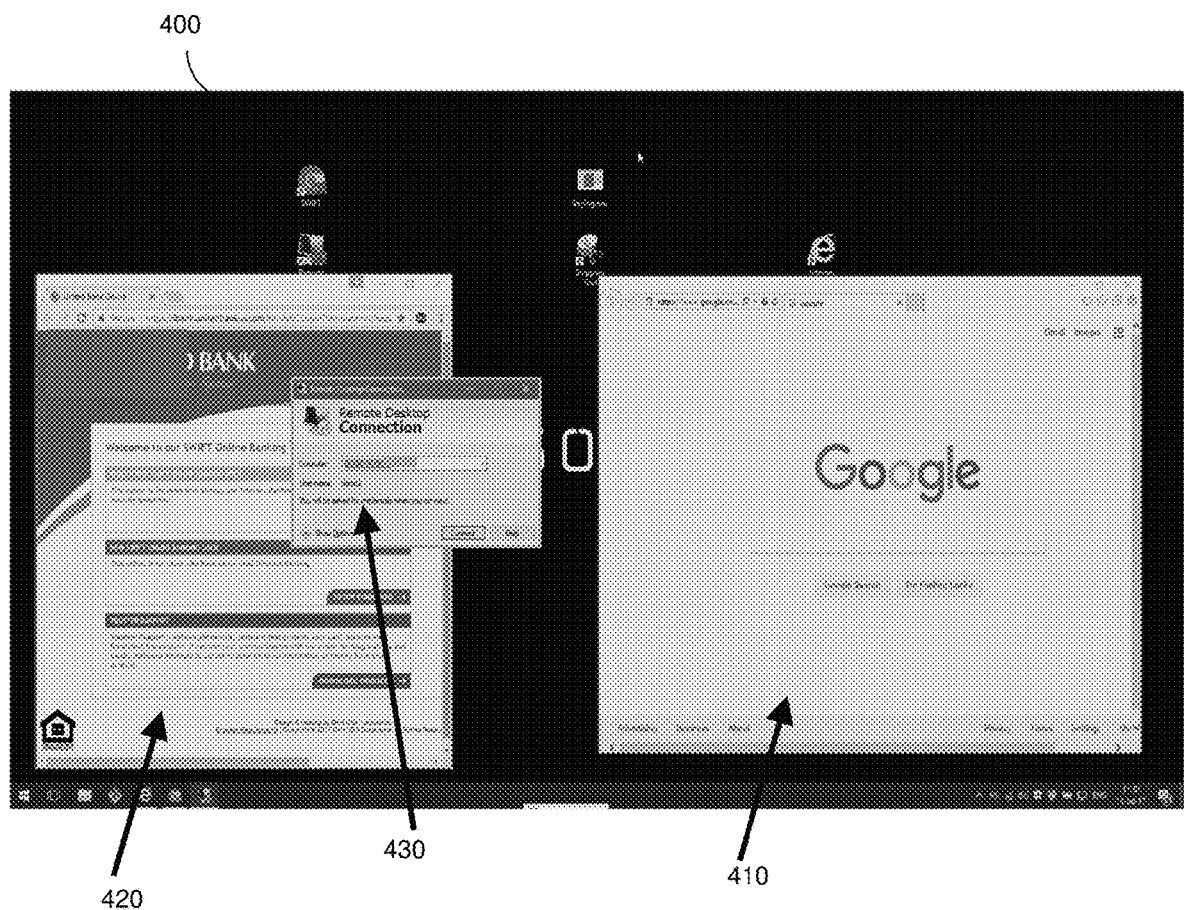
FIG. 4 is a screenshot of an endpoint display.

FIG. 4 shows an example screenshot 400 of an endpoint's desktop display showing windows 410, 420, and 430. The windows 410 and 420 are of web browsers, while the window 430 is a remote desktop client. In this example, the application of window 410 is running in a first security zone (e.g., a corporate zone) while the applications of windows 420 and 430 are of the second security zones (e.g., a privileged zone). The borders of applications are utilized to distinguish between the first and second zone. In the embodiment illustrated in FIG. 4, a user can switch between the windows 410 through 430, that is, between zones.

In another embodiment, only applications of the primary security zones are displayed. In order to display windows of applications from the secondary security zones, application windows in the primary security zone are hidden and the application windows in the secondary security zones are exclusively shown. The switching between zone can be performed using a predefined UX command (e.g., Ctrl+F[1], an icon, a taskbar shortcut, etc.).

It should be emphasized that, regardless of the display mode, applications executed in different zones cannot access each other. There is a complete separation between zones and applications executed therein.

Figure 5:
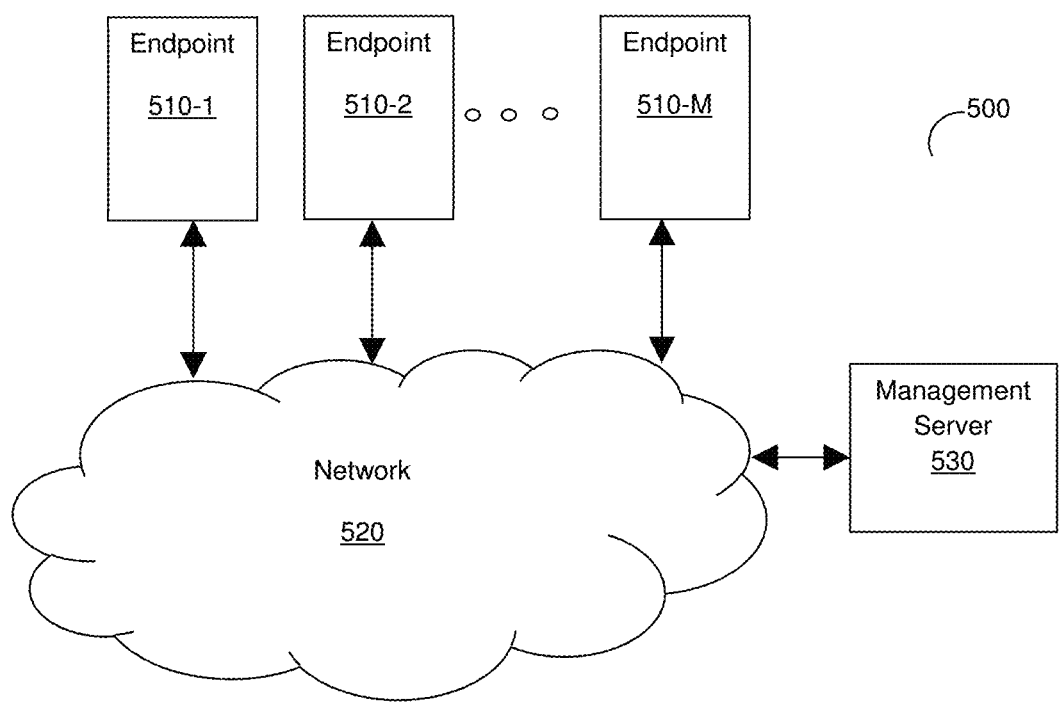
FIG. 5 is a network diagram illustrating a deployment of a management server according to an embodiment.

FIG. 5 shows an example network diagram 500 illustrating a deployment of a management server 530 according to an embodiment. As noted above, the security zones can be configured through the management server 530. This includes defining the type of each zone, the zone's guest OS, and the applications that can be installed and executed in the zone. For example, a security zone can be defined to be a corporate zone running Linux OS and corporate approved applications.

In another embodiment, the security policy for the security zone is also defined through the management server 530. As noted above, a security policy may include network, UX, browser, and connectivity policies.

In an embodiment, the management server 530 may include preconfigured security zones and policies that can be easily uploaded to a new endpoint. In yet another embodiment, the management server 530 can be utilized to clone security zones from one endpoint to another. Therefore, the management server 530 simplifies the process of reconfiguring new endpoints.

As shown in FIG. 5, the management server 530 is connected to a plurality of endpoints 510-1 through 510-M (collectively referred to as endpoints 510) through a network 520. The network 520 may include a local area network (LAN), a wide area network (WAN), the Internet, and the like. In an embodiment, the management server 530 may be deployed on-premises of an organization and managed by the IT personnel of the organization. In yet another embodiment, the management server 530 may be deployed in a cloud computing platform, such as a private cloud, a public cloud, or a hybrid cloud. In such deployment, the management server 530 can serve a plurality of different tenants.

According to the disclosed embodiments, the management server 530 is a secured device. As such, only specific designated endpoints can access the management server 530. In an embodiment, the server 530 accepts connection requests from endpoints including valid certificates, e.g., SSL client certificates. Such certificates are installed only on the designated endpoints.

In the example diagram shown in FIG. 5, only the endpoint 510-2 can access the management server 530 over a secured connection (e.g., SSL connection). The endpoint 510-2 may be, for example, of an administrator. In a further embodiment, only a specific security zone (VM) within the designated endpoint 510-2 can access the management server 530.

Furthermore, when the management server 530 accesses the endpoints 510, the access is performed over a secured connection. Any connection attempt made by the management server 530 to an endpoint 510 is verified by a hypervisor (e.g., the hypervisor 140, FIG. 1). That is, the hypervisor verifies the certificate of the management server 530 before accepting a connection with the management server 530.

The management server 530 may be structured as a computing device including a processing circuitry coupled to a memory, a storage, and a network interface (not shown in FIG. 5).

The processing circuitry may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory may be volatile (e.g., RAM, etc.), non-volatile (e.g., ROM, flash memory, etc.), or a combination thereof. In one configuration, computer readable instructions to implement one or more embodiments disclosed herein may be stored in the storage.

In another embodiment, the memory is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry to perform the various processes described herein with respect to the operation of the management server, such as configuring security zones and policies with the endpoints.

The storage may be magnetic storage, optical storage, and the like, and may be realized, for example, as flash memory or other memory technology, CD-ROM, Digital Versatile Disks (DVDs), or any other medium which can be used to store the desired information. The storage may store the received templates of security zones, policies defined for each zone, SSL certificates, configuration of entire secured zones, and so on.

Figure 6:
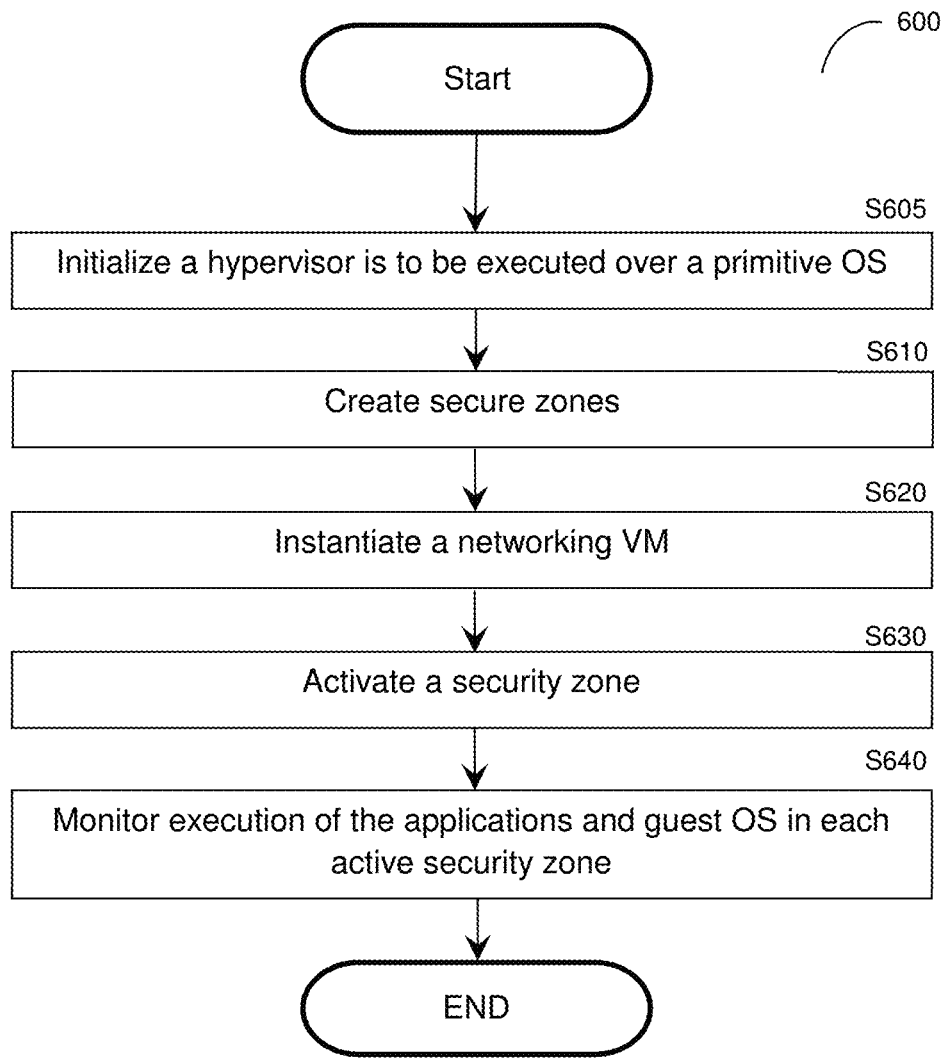
FIG. 6 is a flowchart illustrating a method for operating an air-gapped endpoint in a virtualized environment according to an embodiment.

FIG. 6 shows an example flowchart 600 illustrating a method for operating an air-gapped endpoint in a virtualized environment according to an embodiment.

At S605, a hypervisor is initialized to be executed over a primitive OS. The initialization occurs when the endpoint boots. As discussed in detail above, the primitive OS is limited version of an operating system designed to only run drivers of hardware components.

At S610, a plurality of secure zones is created in the endpoint. In an embodiment, S610 includes instantiating a plurality of VMs by a hypervisor executed over a primitive OS. Each VM runs its own guest OS and a set of applications. In an embodiment, a security policy is associated with each security zone defining at least any one of, or a combination of: a network policy, a UX policy, a browsing policy, and a connectivity policy. The type of the guest OS, applications and policies of each security zone can be retrieved from the management server, e.g., the server 530. In an embodiment, an operating system (OS) booted with the endpoint may be migrated to operate as one of the guest OSs.

At S620, a networking VM is instantiated by the hypervisor. In an embodiment, the networking VM is configured with the network policy of each security zone.

At S630, at least one security zone is activated to be a primary zone. This allows execution of the security zone's applications in the foreground.

At S640, execution of the applications and guest OS in the at least one security zone are monitored to at least maintain compliance with the security policy. To this end, all network access attempts are directed to the networking VM. The networking VM enforces access to external networks based on the network policy. The operation of the networking VM is discussed in detail above.

In an embodiment, S640 further includes checking each HTTP request from a web browser to determine if the request is to access an allowed domain name, as defined in the browsing policy. In an embodiment, S640 further includes capturing UX command initiated by the user and determining, based on the UX policy, if the request UX command is allowed. In yet another embodiment, S640 monitoring connectivity to peripheral devices to determine if such connectivity is permitted. Such connectivity attempt is performed against the connectivity policy.

As noted above, two or more security zones can be concurrently executed in the virtualized environment concurrently. The endpoint can be configured to display applications from different zones, or applications from a different zone only. In an embodiment, windows of applications from different zones are visually distinguished. All applications regardless of their zone are displayed on a unified UX.

Figure 7:
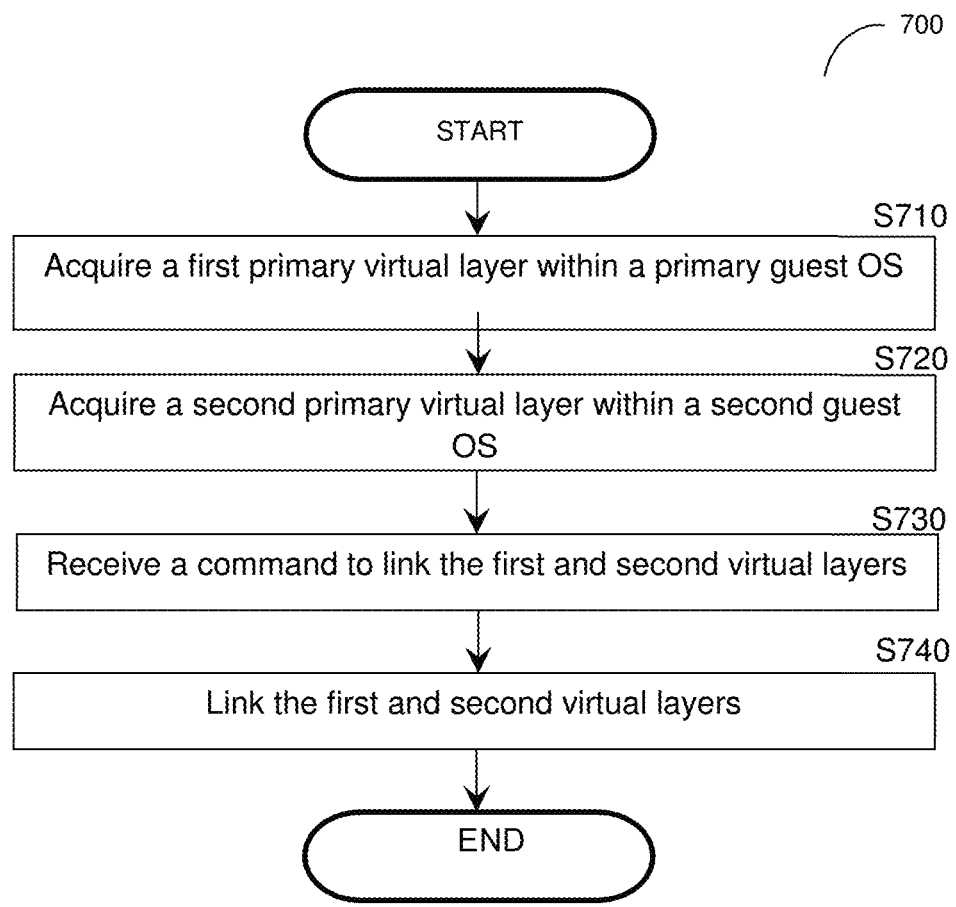
FIG. 7 is a flowchart illustrating a method for clipping virtual layers in multiple isolated virtual machine environments as a single unified UX (user interface) according to an embodiment.

FIG. 7 is a flowchart 700 illustrating a method for clipping virtual layers in multiple isolated virtual machine environments as a single unified UX (user interface) according to an embodiment.

At S710, a first primary virtual layer (first entity window) within a primary guest is acquired. The first virtual layer is configured to execute within a process space of the primary guest executing an operating system in the single user interface.

At S720, a second virtual layer within a secondary guest is acquired. The second virtual layer (second entity window) is configured to execute within a process space of the secondary guest separately executing operating systems distinctly from the process space of the primary guest in the single user interface.

At S730, a command to link the first and second virtual layers is received. The command may be received through a user interface including a graphical user interface replicating, customizing, or both, of the graphical user interface of operating systems that the host and a plurality of guests separately execute.

At S740, the virtual layers are linked. The linkage of such layers causes, when the primary guest is activated, the first and second virtual layers visually to overlap. That is, while operating within distinct operating systems, the primary guest is presented on top.

In an embodiment, the linking is performed at least in part by: specifying, through the user interface, the first virtual layer and the second virtual layer as visually overlapping for including the single user interface as a single desktop environment; executing the command to create OS-specific captured user interface elements clipping, according to the specifying of the first virtual layer and the second virtual layer, such that the first virtual layer and the second virtual layer execute within the process space of distinct operating systems, wherein the primary guest is presented on top; and presenting, through the user interface, the first virtual layer and the second virtual layer as visually overlapping for including the single user interface as a single desktop environment.

Figure 8:
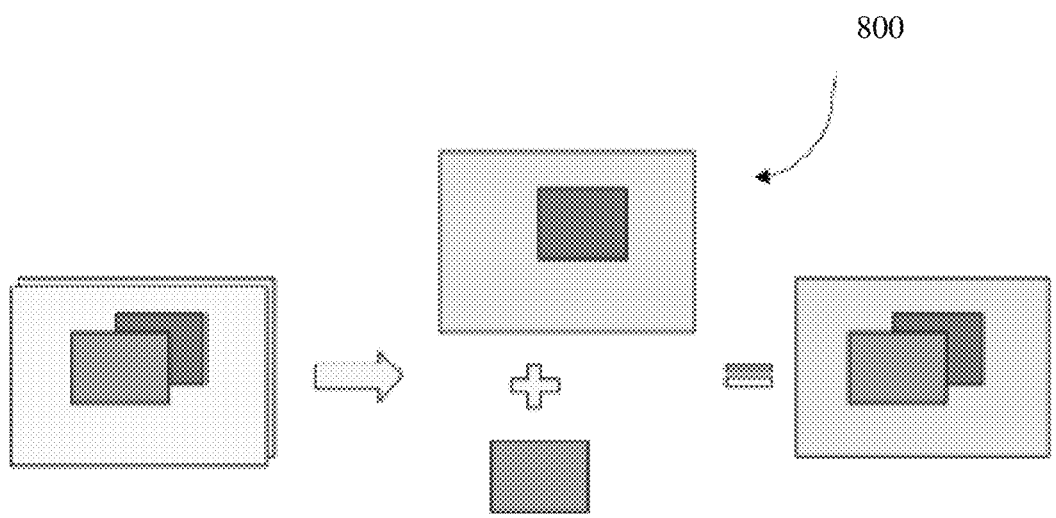
FIG. 8 is a schematic diagram illustrating a second virtual machine window overlapping a first virtual machine window.

In the endpoint's display, both VM windows can be displayed in such a way that the second VM window is displayed above (thus overlapping) the first VM window. Since the second VM window now contains only the second entity, the achieved configuration 800 is that the second entity displayed on top of the entire first VM content (including the first entity as graphically illustrated in FIG. 8).

Figure 9:
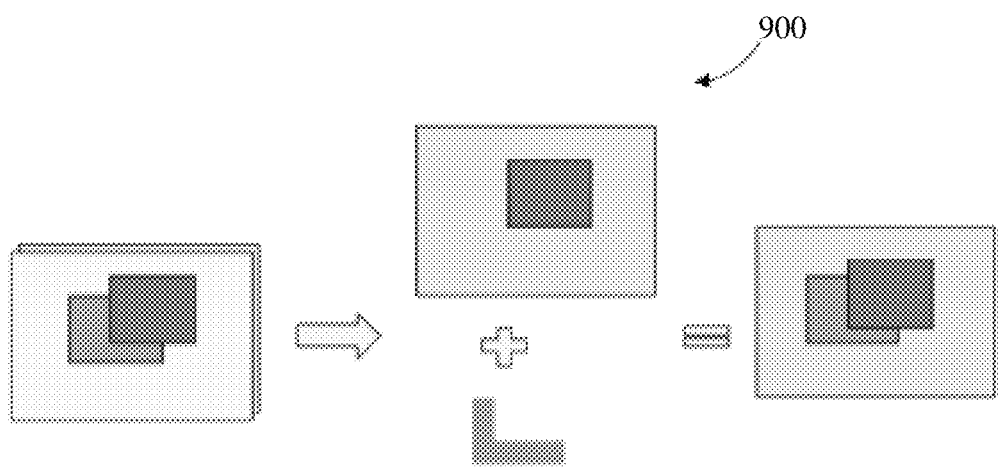
FIG. 9 is a schematic diagram illustrating a second virtual machine window placed over a clipped version of a first virtual machine window.

In another embodiment, the method of flowchart 700 may include receiving a command to also clip the area of the first entity that intersects with the second entity. In the endpoint's display, both VM windows can be displayed in such way that the second VM window is displayed on top of the entire first VM content (including the first entity). Since the second VM window now contains only part of the second entity (the entity area that does not overlap with the first entity area), the achieved configuration 900 is that the first entity is on top of the second entity, which is on top of the rest of the first VM content (as graphically illustrated in FIG. 9).

Upon completion of the clipping process, an attempt by a user to modify position, dimensions, state, or a combination thereof, of a guest entity while the virtual clipping layer is active may be identified. The modification may be applied to the single desktop environment, such modification as a result of user interaction to graphical user interface in a form of overlapping is updated in real-time.

The modification can be additionally configured to toggle the activation of the first virtual layer and the second virtual layer in the graphical user interface interchangeably based on the user interaction using the integrated access to the mouse, keyboard, screen, and resources in the single user interface comprising a single desktop environment. The user interaction includes managing changes to applications and interface components of the displayed environments based on default security policies, predetermined security policies, or both, using the integrated access to the mouse, keyboard, screen, and resources in the single user interface comprising a single desktop environment in real-time. The integrated access to the mouse, keyboard, screen, and resources in the single user interface comprising a single desktop environment in real-time acquires priority condition based on the default security policies, predetermined security policies, or both. For example, the keyboard can be redirected to the VM that the top entity (guest window) belongs to. The host can also show entities (host windows), that can be displayed on top of the first VM but below the second VM. The clipping action will isolate an area in the second VM in the area of the host entity. The achieved configuration is that the host entity appears as the top window. The modification can also be configured to toggle the activation of the first virtual layer and the second virtual layer in the graphical user interface interchangeably based on the user interaction.

In an embodiment, entities (guest windows) of the second VM can be represented in the task-bar and app-switcher (ALT+TAB) with the corresponding icons, even though they are not running on said VM. This creates an illusion for the user that the entities from the second VM are running on the first VM (or in other words, that entities from both VMs are all running on the first primary VM).

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A method for operating an air-gapped endpoint, comprising:
   initializing, on the air-gapped endpoint, a hypervisor for execution over a primitive operating system (OS) of the air-gapped endpoint;
   creating a plurality of isolated security zones by instantiating a plurality of corresponding virtual machines using the hypervisor, wherein each of the plurality of security zones includes a plurality of applications executed over a guest OS;
   instantiating a networking virtual machine using the hypervisor, wherein the networking virtual machine is instantiated to operate in a non-persistent mode;
   controlling, by the networking virtual machine, access of each application in each of the plurality of security zones to an external network resource;
   reverting the networking virtual machine to its initial state upon at least a disconnect event from the external network resource; and
   monitoring execution of the guest OS and each application in at least one activated security zone of the plurality of security zones, wherein the monitoring is performed to maintain compliance with a security policy corresponding to each activated security zone being monitored, wherein the primitive OS is executed by a hardware layer of the air-gapped endpoint, and wherein the primitive OS is configured to execute only pre-signed code of device drivers.

2. The method of claim 1, wherein the hypervisor includes an abstraction layer, at least one native hypervisor, an optimization module, and a security module.

3. The method of claim 2, further comprising:
   integrating, by the abstraction layer, the at least one native hypervisor, wherein the optimization module is configured to optimize the execution of the at least one native hypervisor.

4. The method of claim 2, further comprising:
   preforming an optimization process by the optimization module, wherein the optimization processes includes at least one of: graphics rendering, sound playback, and power consumption.

5. The method of claim 2, further comprising:
enforcing the security policy of a corresponding security zone of the plurality of security zones.

6. The method of claim 1, wherein each security policy defines at least one of: a network policy, a user interface (UX) policy, a browsing policy, and a connectivity policy.

7. The method of claim 6, wherein the UX policy defines user interface actions allowed to be performed by the user in the corresponding activated security zone.

8. The method of claim 6, wherein the browsing policy defines a whitelist of uniform resource locators (URLs) or domain names that can be accessed from a browser executed in the corresponding activated security zone.

9. The method of claim 6, wherein the connectivity policy defines a set of allowed peripheral devices through any one of: a wired connection, and a wireless connection.

10. The method of claim 6, wherein the network policy defines, for each application in the corresponding activated security zone, at least one external network resource that is permitted to be accessed, and an access type for the at least one external network resource.

11. The method of claim 10, wherein controlling access of each application in each of the plurality of security zones to an external network resource further comprises:
receiving all network access requests from each application;
determining if each received network access request complies with the network policy for the corresponding activated security zone; and
allowing or denying each network access request based on the determination.

12. The method of claim 11, wherein allowing the network access request further comprises:
directing the network access request to a network interface card (NIC) of the air-gapped endpoint.

13. The method of claim 11, wherein denying the network access request further comprises:
applying at least one firewall rule to block the network access request.

14. The method of claim 1, wherein at least one of the plurality of security zones is activated in a foreground and at least one of the plurality of security zones is activated in a background.

15. The method of claim 14, further comprising:
displaying windows of applications executed in at least two different security zones on the same desktop display.

16. A non-transitory computer readable medium having stored thereon instructions for causing a processing circuitry to execute a process for operating an air-gapped endpoint, the process comprising:
initializing, on the air-gapped endpoint, a hypervisor for execution over a primitive operating system (OS) of the air-gapped endpoint;
creating a plurality of isolated security zones by instantiating a plurality of corresponding virtual machines using the hypervisor, wherein each of the plurality of security zones includes a plurality of applications executed over a guest OS;
instantiating a networking virtual machine using the hypervisor, wherein the network virtual machine is instantiated to operate in a non-persistent mode;
controlling, by the networking virtual machine, access of each application in each of the plurality of security zones to an external network resource;
reverting the networking virtual machine to its initial state upon at least a disconnect event from the external network resource; and
monitoring execution of the guest OS and each application in at least one activated security zone of the plurality of security zones, wherein the monitoring is performed to maintain compliance with a security policy corresponding to each activated security zone being monitored, wherein the primitive OS is executed by a hardware layer of the air-gapped endpoint, and wherein the primitive OS is configured to execute only pre-signed code of device drivers.

17. An air-gapped computing system, comprising:
a network interface card;
a processing circuitry; and
a memory, the memory containing instructions that, when executed by the processing circuitry, configure the system to:
initialize a hypervisor for execution over a primitive operating system (OS);
create a plurality of isolated security zones by instantiating a plurality of corresponding virtual machines using the hypervisor, wherein each of the plurality of security zones includes a plurality of applications executed over a guest OS;
instantiate a networking virtual machine using the hypervisor, wherein the network virtual machine is instantiated to operate in a non-persistent mode;
control, by the networking virtual machine, access of each application in each of the plurality of security zones to an external network resource;
revert the networking virtual machine to its initial state upon at least a disconnect event from the external network resource; and
monitor execution of the guest OS and each application in at least one activated security zone of the plurality of security zones, wherein the monitoring is performed to maintain compliance with a security policy corresponding to each activated security zone being monitored, wherein the primitive OS is executed by a hardware layer of the air-gapped endpoint, and wherein the primitive OS is configured to execute only pre-signed code of device drivers.

18. The system of claim 17, wherein the hypervisor includes an abstraction layer, at least one native hypervisor, an optimization module, and a security module.

19. The system of claim 18, wherein the abstraction layer executed over the processing circuitry is configured to integrate the at least one native hypervisor, and wherein the optimization module is configured to optimize the execution of the at least one native hypervisor.

20. The system of claim 19, wherein the optimization module executed over the processing circuitry is configured to optimize at least one of: graphics rendering through a GPU of the system, sound playback through a sound card of the system, and power consumption of the system.

21. The system of claim 18, wherein the security module executed over the processing circuitry is configured to enforce the security policy of a corresponding security zone of the plurality of security zones.

22. The system of claim 17, wherein each security policy defines at least one of: a network policy, a user interface (UX) policy, a browsing policy, and a connectivity policy.

23. The system of claim 22, wherein the UX policy defines user interface actions allowed to be performed by the user in the corresponding activated security zone.

24. The system of claim 22, wherein the browsing policy defines a whitelist of uniform resource locators (URLs) or domain names that can be accessed from a browser executed in the corresponding activated security zone.

25. The system of claim 22, wherein the connectivity policy defines a set of allowed peripheral devices through any one of: a wired connection, and a wireless connection.

26. The system of claim 22, wherein the network policy defines, for each application in the corresponding activated security zone, at least one external network resource that is permitted to he accessed and an access type for the at least one external network resource.

27. The system of claim 26, wherein the system is further configured to:
receive all network access requests from each application;
determine if each received network access request complies with the network policy for the corresponding activated security zone; and
allow or deny each network access request based on the determination.

28. The system of claim 27, wherein the system is further configured to:
direct the network access request to a network interface card (NIC) of the air-gapped computing.

29. The system of claim 28, wherein the system is further configured to:
apply at least one firewall rule to block the network access request.

30. The system of claim 17, wherein at least one of the plurality of security zones is activated in a foreground and at least one of the plurality of security zones is activated in a background.

31. The system of claim 30, wherein the system is further configured to:
display windows of applications executed in at least two different security zones on the same desktop display.

* * * * *